United States Patent [19]

Kizu et al.

[11] Patent Number: 4,691,100
[45] Date of Patent: Sep. 1, 1987

[54] SHEET ORIENTER USING FLAP DETECTION

[75] Inventors: Shuji Kizu; Tsuyoshi Ishida, both of Yokohama; Yasuo Nagase, Tokyo, all of Japan

[73] Assignee: Kabushiki Kaisha Toshiba, Kawasaki, Japan

[21] Appl. No.: 629,964

[22] Filed: Jul. 11, 1984

[30] Foreign Application Priority Data

Jul. 13, 1983 [JP] Japan ................................ 58-127282

[51] Int. Cl.⁴ .......................... G01N 9/04; G06M 7/00
[52] U.S. Cl. .................................. 250/223 R; 250/561
[58] Field of Search ............................ 250/223 R, 561; 209/528; 356/371, 376

[56] References Cited

U.S. PATENT DOCUMENTS 4,286,149  8/1981  Ben-Nathan et al. ........... 250/223 R
4,323,786  4/1982  Snow ............................... 250/223 R Primary Examiner—David C. Nelms
Assistant Examiner—Stephone B. Allen
Attorney, Agent, or Firm—Cushman, Darby & Cushman

[57] ABSTRACT

There is a sorting apparatus for mixed envelopes according to whether or not the envelopes are face-up, and whether or not they are upside-down. Each envelope is carried lengthwise and a parallel light beam is radiated on the envelope from the right and left oblique directions with respect to the carrying direction of the envelope. When the light beam is radiated on the backside of the envelope from the upper side of the envelope, the shadow of the flap is formed on the envelope. Whether or not the envelope is face-up and whether or not the envelope is rightside-up is determined by this shadow detection.

8 Claims, 10 Drawing Figures

SHEET ORIENTER USING FLAP DETECTION

BACKGROUND OF THE INVENTION

This invention relates to an apparatus for detecting whether or not a paper sheet is flat.

Such detection is needed for automatically handling postal matter. Recently, in Japan, the various handling steps of impressing a cancellation mark and distinguishing the destination have been automated. Regular Japanese domestic mail prior to sorting in a post office may be in a mixed condition where the mail is facing the wrong way or where the mail is upside down. Therefore, before a cancellation mark is impressed on a stamp, it is necessary to straighten out the mail according to whether or not it is face up and whether or not the mail is upside down. Usually, a stamp or mailing label is usually applied in a prescribed location of the envelope in regards to Japanese domestic mail only. (In Japan, the upper right-hand corner of the front side is used.) Therefore, the sorting of the Japanese domestic mail can be carried out in accordance with the detected position of a stamp or mailing label. The Japanese domestic postage stamp or mailing label is generally treated with a chemical process (for instance, to ensure a chemical reaction with ultraviolet rays), thereby facilitating the detection of a postage stamp or mailing label while the mail is being transferred one by one through a sorting machine. While the mail is being carried through the sorting machine, it is impressed with a cancellation mark and is straightened out by means of a front and back reversing machine or an up and down reversing machine. The postal district numbers written in the prescribed corner of the postal matter are read to sort the mail in accordance with its destination. Where a postal district number is not written in the prescribed position of the surface of the postal matter a postal district number is impressed by a post office clerk using a bar code printer in the form of a bar code in a prescribed position on the surface of the postal matter (for example, the lower righthand corner of the surface thereof) after straightening out the postal matter. The bar codes are read as postal district numbers using a bar code reader, thereby ensuring a prominent saving of labor and a quick delivery of the postal matter.

Outside of Japen, however, postage stamps or mailing labels are not chemically treated. Therefore, the automatic sorting of postal matter relying on the detection of a chemically processed postage stamp or mailing mark has failed to be affected. Therefore, it is desired to detect whether or not the mail is face up, and whether or not the top is up without using the postage stamp or mailing label. Aside from the postage stamp or mailing label, the flap of an envelope is also at a prescribed position within the mailing matter. However, there is no method of exactly detecting the position of the flap. Therefore, postal matter must be manually straightened out by a post office clerk. Thereafter, the postal matter is set in a bar code printer or postal district number reader. The manual work of straightening out the mail consumes a considerable amount of time, obstructing the quick delivery of the postal matter.

SUMMARY OF THE INVENTION

An object of the present invention is to provide an apparatus for detecting the directions of a paper sheet, such as an envelope, and to contribute to saving labor in a later processing.

The object of the present invention is realized by an apparatus and method for detecting the direction of a paper sheet in which a paper sheet is transported. A parallel light beam is radiated on one surface of the paper sheet being transported from an oblique direction with respect to the surface of the paper sheet, and the parallel light beam crosses the direction of the outline of the flap. A light beam reflected from one surface of the paper sheet is received to detect a shadow which is caused by the flap being obliquely radiated from the parallel light beam. The judging means then determines whether the second surface is facing the receiving means when the receiving means does not detect the shadow or the first surface is facing the receiving means when the receiving means does detect a shadow. The first and second surfaces of the paper sheet are reversed when the judging means determines that the second surface is facing the receiving means. The reversing means also carries said paper sheet back to the transporting means after the reversing.

According to the above mentioned apparatus, and method when the parallel light beam is radiated on the paper sheet from an oblique direction with respect to the paper sheet, a shadow is or is not formed depending on whether or not the flap is included in the surface of the paper sheet. Therefore, the direction of the paper sheet is accurately detected on the basis of the flap shadow detection.

DETAILED DESCRIPTION OF THE PREFERRED EMBODIMENT

Figure 1:
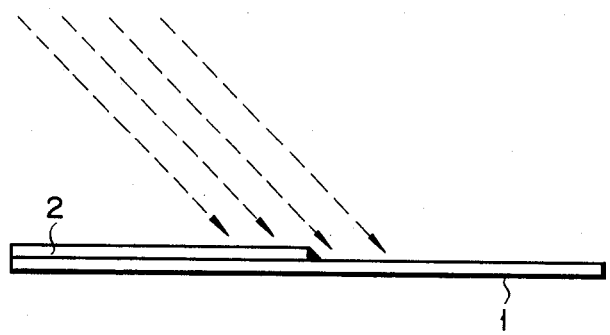
FIGS. 1 and 2 show a principle of nonflatness detection according to the present invention.

Before describing an embodiment of the present invention, a principle of flatness detection will be described. It is assumed that the object paper sheet is an envelope having a flap on the upper side of the back. As shown in FIG. 1, a parallel light beam is radiated on the envelope (object) 1 from an oblique direction with respect to the surface of the envelope 1. Where a flap 2 is on the surface of the envelope 1 and the parallel light beam is crossing the edge of the flap 2, the flap 2 interrupts the parallel light beam so that a shadow is formed on the surface of the envelope 1. It is possible to detect the flatness of the surface of the envelope 1, i.e., to detect the presence or absence of the flap on the envelope by receiving the reflected light from the envelope 1 and by determining the presence or absence of the shadow. However, when the parallel light beam is radiated from the right side (as in the drawing of FIG. 1) of the envelope 1. the shadow is not formed, even if the flap 2 is on the envelope 1 as shown in FIG. 1. Therefore, it is possible to determine whether or not the envelope is face up, and whether or not the top is up by considering from which side the light beam has been radiated.

Figure 2:
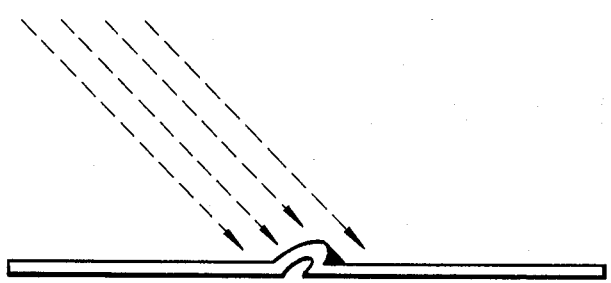

The object paper sheet is not limited to an envelope. A paper sheet having a wrinkle or an article whose surface includes a distortion may also be an object. The wrinkle of the paper sheet also forms a shadow on the surface as shown in FIG. 2. A return address is sometimes written on the back of an envelope. In such a case, the return address is also detected as a shadow. The difference between the shadow of the flap and that of the return address is in continuity. The shadow of the return address is not continuous, but the shadow of flap is. The nonflatness is detected only when the shadow continues for a predetermined length.

Figure 3A:
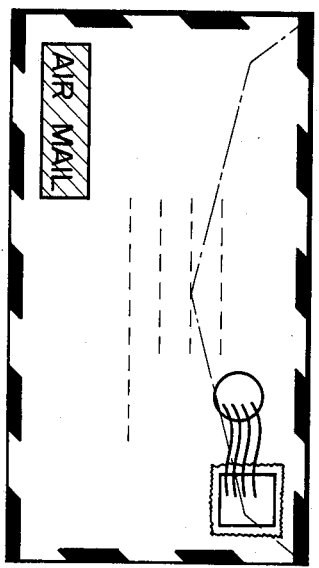
FIGS. 3A to 3D show various conditions of the envelope, as an example of a paper sheet.
Figure 3B:
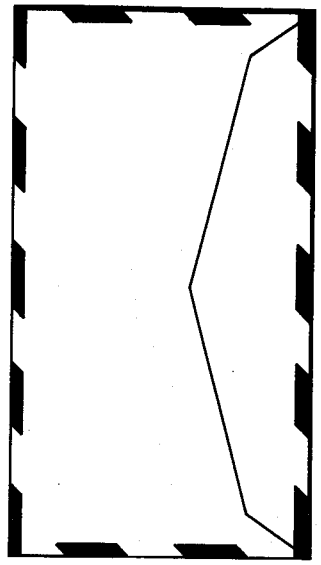
Figure 3C:
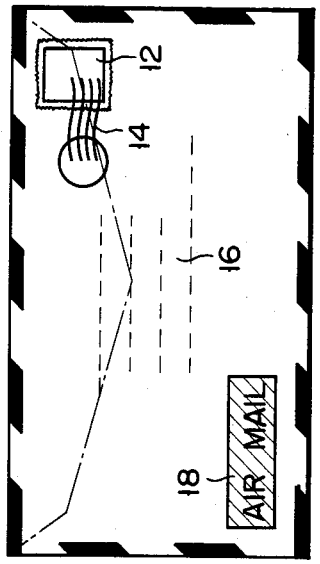
Figure 3D:
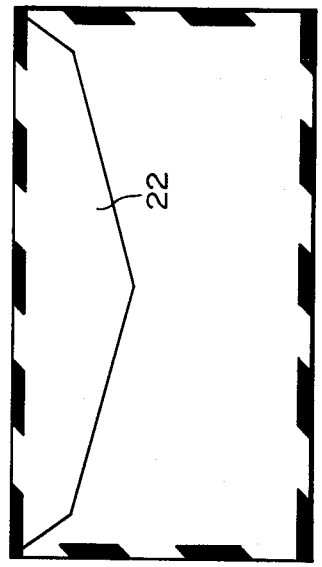

An envelope sorting apparatus as an embodiment of the present invention will be described. FIGS. 3A to 3D show all the possible conditions of the envelope set in the sorting apparatus. FIG. 3A shows the front of a rightside-up envelope. FIG. 3B shows the front of an upside-down envelope. FIG. 3C shows the back of a rightside-up envelope. FIG. 3D shows the back of an upside-down envelope. As shown in FIG. 3A, a stamp 12, a cancellation mark 14, an address 16, and an airmail mark 18 exist on the front 10 of an envelope. Although the stamp 12 (cancellation mark 14) exists in the upper right-hand position of the envelope illustrated, in some cases, it can exist in the lower righthand position or in the upper left-hand position or the like; its position is not constant (this was conventionally one of the reasons why the detection of a stamp is difficult). The address 16 is usually written in the central position. The airmail mark 18 also generally exists in a fixed position, stuck or printed on the left half of the face-up rightside-up envelope. Further, the airmail mark 18 is almost always indicated in red or blue, or in equal amounts or both red and blue. Nothing is ordinarily written on the back 20 of the envelope, only a flap 22 is present. The flap 22 is folded from the top of the envelope. Namely, features of such an envelope are that the red or blue airmail mark 18 exists on the left half of the front of the rightside-up envelope, that the flap 22 exists in the upper portion of the back, and that the printed area on the front of the envelope is considerably larger than that on the back. Therefore, by paying attention to these points whether or not the envelope is face up or rightside-up can be certainly and correctly detected.

Figure 4:
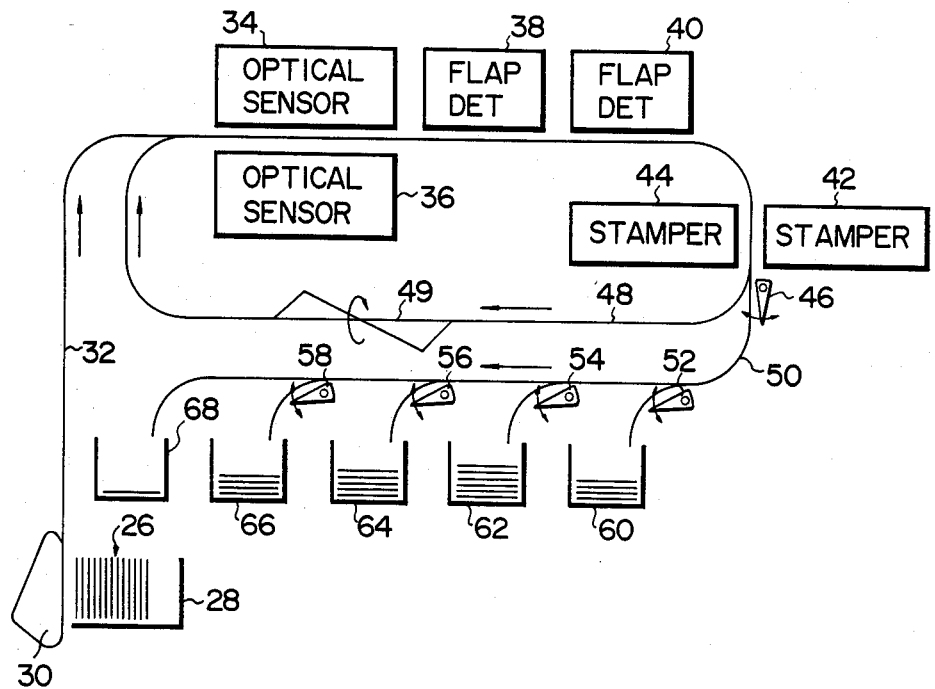
FIG. 4 is a cross-sectional view of an envelope sorting apparatus as one embodiment of the present invention.

FIG. 4 schematically shows a cross-sectional view of the envelope sorting apparatus according to the present invention. A number of envelopes 26 collected from a number of mail boxes are placed on an envelope feeder 28. The envelopes 26, picked up one by one by a pickup 30 of the absorption chamber type, are carried by a carrying belt 32. The carrying belt 32 comprises a pair of belts supporting the upper side and the lower side of the envelopes 26. It is assumed that each envelope 26 is carried in the manner such that the longitudinal direction thereof coincides with the carrying direction. Namely, the length of the envelope 26 placed in the envelope feeder 28 shown in FIG. 4 corresponds to the longitudinal length of the envelope 26. During the traveling of the envelope 26, the printed areas on both sides of the envelope which are above and below the carrying belts 32, and the position of the airmail mark 18 are detected by a pair of optical sensors 34 and 36 which are disposed on both sides to be above and below the carrying belt 32. After passing through the optical sensors 34 and 36, the envelope 26 is further checked by flap detectors 38 and 40 to detect the presence or absence of the flap 22 on the upper side of the carrying belt 32. As shown in FIG. 1, the flap detector can detect the flap only when the flap and a light source are in the same side. Therefore, two flap detectors 38 and 40 are provided. In this embodiment, the flap detector 38 detects the flap, for example, on the right side in the traveling direction of the envelope 26, and the detector 40 detects the flap on the left side. Thereafter, the reception mark denoting that the envelope has been received is stamped on the back of the envelope 26 by means of a pair of stampers 42 and 44 which are disposed on both sides to be above and below the carrying belt 32.

If the envelope 26 is initially carried with the flap 22 being located at the lower side of the carrying belt 32, it is impossible to detect the presence of flap. In this case, the envelope 26 is led to a reversing belt 48 by a gate 46. The front and back of the envelope 26 is then reversed (at this time, the top and bottom is also reversed in association with the reversing operation of the front/back); this reversed envelope is again placed on the carrying belt 32 before the optical sensors 34 and 36. The reversing belt 48 has a reversing section 49 wherein the belt itself is twisted once halfway. This is because the flap detectors 38 and 40 are provided on only the upper side of the carrying belt 32 because of the spatial limitations. After the condition of the envelope 26 is discriminated and the reception mark is stamped thereon, it is led to a sorting carrier passage 50 by the gate 46 and is put in either a first, second, third, or fourth collecting box 60, 62, 64, and 66 by the operation of gates 52, 54, 56, and 58 in accordance with the classification discriminated. For example, the face-up rightside-up envelope 26 (FIG. 3A) is collected in the first collecting box 60; the face-up upside-down envelope 26 (FIG. 3B) is collected to the second collecting box 62; the face-down rightside-up envelope 26 (FIG. 3C) is collected in the third collecting box 64; and the face-down upside-down envelope 26 (FIG. 3D) is collected in the fourth collecting box 66. On the other hand, the envelope 26 whose condition can not be discriminated even at the second carrying operation is led to a reject collecting box 68, and is manually discriminated by the post office clerk who puts it into the appropriate collecting box.

Figure 5:
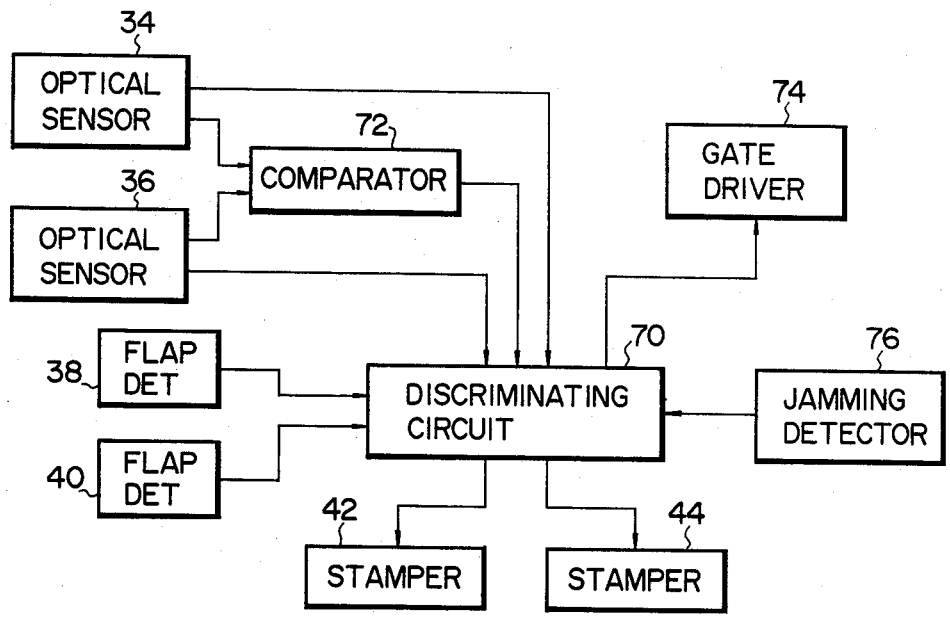
FIG. 5 is a block diagram of a control circuit of the envelope sorting apparatus of FIG. 4.

FIG. 5 is a block diagram showing the control circuit in this embodiment. First output from the optical sensors 34 and 36 are supplied to a discriminating circuit 70, and second outputs from the optical sensors 34 and 36 are supplied to a comparator 72. Outputs of the flap detectors 38 and 40 are supplied to the discriminating circuit 70. The discriminating circuit 70 controls the stampers 42 and 44, and also controls a gate driver 74 to drive the gates 46, 52, 54, 56, and 58. Although not shown in FIG. 4, an output of a jamming detector 76 to detect a jam during the carrying operation is also input to the discriminating circuit 70.

Figure 6:
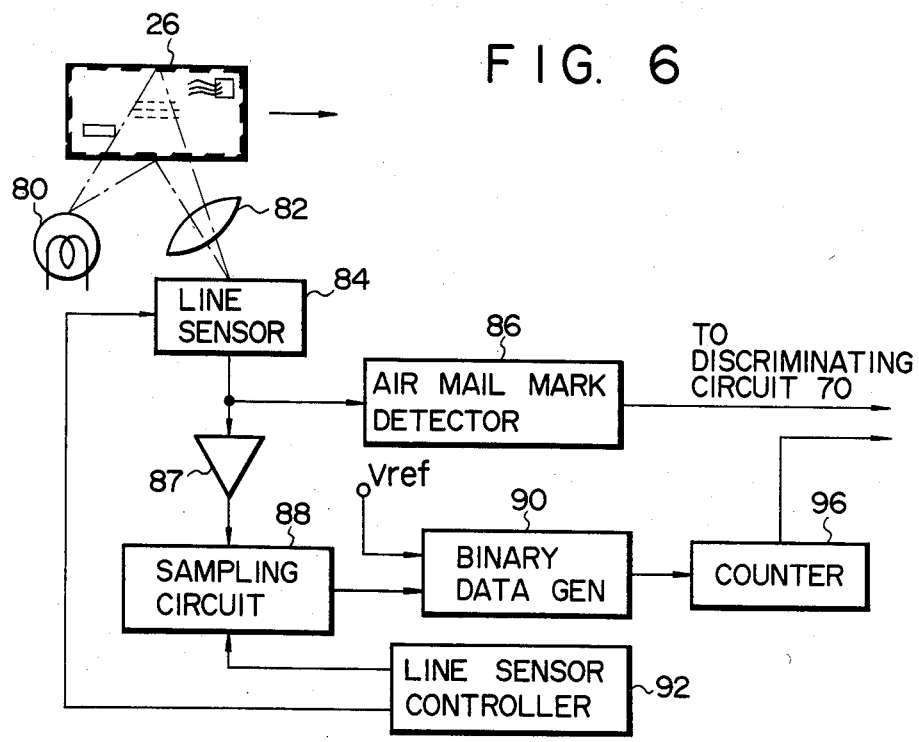
FIG. 6 is a detailed block diagram of an optical sensor involved in FIG. 3.

FIG. 6 is a detailed block diagram of each of the optical sensors 34 and 36. The optical sensors have a light source lamp 80 which illuminates one side of the envelope 26 which is being carried. The reflected light from the envelope 26 enters a line sensor 84 through a focusing lens 82 and is photoelectrically converted to an electrical signal. The output signal of the line sensor 84 is supplied to an airmail mark detector 86 and is input through an amplifier 87 and a sampling circuit 88 to a binary data generator 90. Since the airmail mark has a size which is larger than a certain size, the airmail mark detector 86 detects the presence of the airmail mark and the position thereof by the fact that the area of red or blue on one side of the envelope 26 is larger than a certain size. The detection of the position of the airmail mark is made by checking whether it is located in the leading half region or trailing half region of the envelope carried. An output signal of the airmail mark detector 86 is supplied to the discriminating circuit 70. The sampling circuit 88 samples the output analog signal of the line sensor 84 in response to the sampling pulse from a line sensor controller 92 and supplies the sampled signal to the binary data generator 90. The binary data generator 90 compares the sampled signal of the sampling circuit 88 with a reference signal $V_{ref}$ and converts the output signal of the line sensor 84 to the binary signal. Namely, the output signal of the line sensor 84 is sampled by the sampling circuit 88 for every pixel, and the sampled signal is converted to a binary signal indicative of the black or white of the pixel (the presence or absence of characters) by the binary data generator 90. The output pulse signal of the binary data generator 90 is input to a counter 96 and is counted. Due to this, the amount of characters, i.e., the printed area, of one side of the envelope 26 is detected as the count value. The output data of the counter 96 is supplied to the comparator 72 and is compared with the printed area of the other side of the envelope 26.

Figure 7:
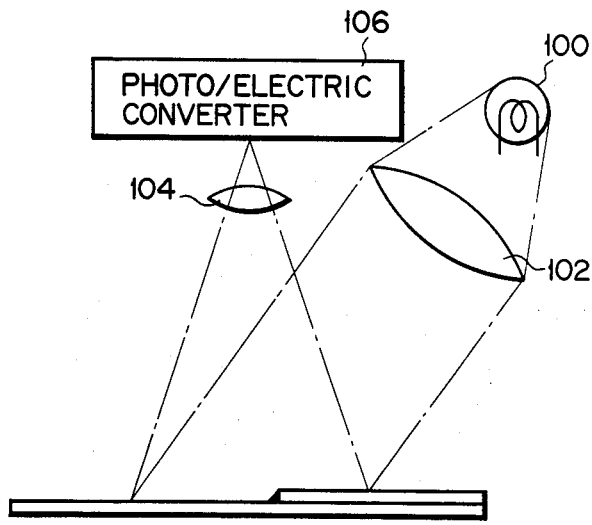
FIG. 7 is a block diagram indicating a flap detector included in FIG. 3.

FIG. 7 shows the constitution of each of the flap detectors 38 and 40. Although the flap detectors 38 and 40 are also optical sensors in principle, these detectors detect the shadow which is formed on the surface of the envelope 26 because of the presence of the flap by irradiating the parallel light obliquely to the envelope 26. With respect to this point, they are different from the optical sensors 34 and 36 which detect the characters and airmail mark on the surface of the envelope 26. The flap detector comprises: a light source lamp 100 provided at the oblique upper location of the carrying belt 32; a collimator lens 102 for converting the light from the light source lamp 100 to the parallel light; and a photoelectric converter 106 which receives through a lens 104 the light reflected from the envelope 26. Since the thickness of the paper forming the envelope is on the order of about 100μ, it is necessary to set an angle of light which is irradiated obliquely to be substantially parallel to the paper in order to form the shadow. As described above, the light source lamp 100 of the flap detector 38 is disposed on the right side in the traveling direction of the envelope 26, while the light source lamp 100 of the flap detector 40 is disposed on the left side in the traveling direction of the envelope 26. Thus, the flap detector 38 detects the shadow formed due to the flap which exists on the right side in the traveling direction of the envelope 26, while the flap detector 40 detects the shadow formed due to the flap which exists on the left side in the traveling direction of the envelope 26. The discriminating circuit 70 detects the flap on the basis of not only the presence of the shadow but also on the shape of the shadow, (for instance, the shadow of a flap may have a V-shape or a straight line).

The operation of this embodiment will then be described. When the envelopes 26 are set to the envelope feeder 28 and the power supply of the apparatus is turned on, the carrying belt 32, the reversing belt 48, and the sorting carrier passage 50 are driven, and at the same time the envelopes 26 are fed one after another on the carrying belt 32 by the pickup 30 and are carried to the optical sensors 34 and 36. The printed area of the surface of the face with regard to the traveling direction of the envelope 26 is measured by the counter 96 of the optical sensor 34 disposed over the carrying belt 32. On the other hand, the printed area of the surface on the back with regard to the traveling direction of the envelope 26 is measured by the counter 96 of the optical sensor 36 disposed below the carrying belt 32. The count values of the counters 96 of both optical sensors 34 and 36 are compared by the comparator 72. When the output of the comparator 72 indicates that the count value of the counter 96 of the optical sensor 34 is larger than the count value of the counter 96 of the optical sensor 36, the discriminating circuit 70 determines that the envelope 26 is carried with the faceup. When the count value of the counter 96 of the optical sensor 34 is smaller than that of the optical sensor 36, it determines that it is facedown.

At the same time, the optical sensors 34 and 36 measure the areas of the red or blue regions of both surfaces which are over and below the carrying belt 32 by the airmail mark detector 86. When the measured area is larger than a prescribed size, this region is determined to be the airmail mark. When the airmail mark detector 86 of the optical sensor 34 makes this decision, it is determined that the envelope 26 is carried in the right-side-up state. Also, in the case where this region is located in the leading half portion of the envelope 26 in the traveling direction thereof, it is determined that the envelope is upside-down. While in the case where it exists in the trailing half portion of the envelope, it is determined that the envelope 26 is in the rightside-up state. In this case, "up" is the left side in the travelling direction of the envelope and "down" is the right side. In contrast, when the airmail mark detector 86 of the optical sensor 36 makes the above-mentioned decision, it is determined that the envelope 26 is carried in the face-down state. Further, in the case where this region is located in the leading half portion of the envelope 26 in the traveling direction thereof, it is determined that the envelope 26 is in the rightside-up state; while in the case where it exists in the trailing half portion of the envelope, it is determined that the envelope 26 is in the upside-down state.

Since the flap detectors 38 and 40 are disposed on one side over the carrying belt 32, they can detect the flap only when the envelope 26 is carried in the face-down state. Due to this, the flap detectors 38 and 40 are turned on only when it is determined by the optical sensors 34 and 36 that the envelope 26 is in the face-down state, thereby discriminating whether the flap is located on the right side or the left side in the traveling direction of the envelope. When it is detected that the flap is located on the right side of the traveling direction of the envelope by the flap detector 38, since the flap is located on the face of the envelope 26, it is determined that the envelope 26 is placed in the face-down state. On the contrary, when it is detected by the flap detector 40 that the flap is located on the left side of the traveling direction of the envelope, it is determined that the envelope 26 is in the face-up state. When it is determined that the envelope 26 is in the face-up state by the optical sensors 34 and 36, the envelope 26 is led to the reversing belt 48 by the gate 46 to reverse the position of the envelope. Then, this reversed envelope is again fed to the optical sensors 34 and 36, and to flap detectors 38 and 40.

Namely, according to this embodiment, the discriminating circuit 70 determines as follows in response to the outputs of the optical sensors 34 and 36, comparator 72, and flap detectors 38 and 40.

(1) When the output of the comparator 72 indicates that the output of the optical sensor 34 is greater than the output of the optical sensor 36, when the airmail mark detector 86 of the optical sensor 34 detects the airmail mark in the trailing half portion of the envelope, and when the flap detector 38 detects the flap after the front and back of the envelope is reversed, the envelope is:

face-up/rightside-up (2) When the output of the comparator 72 indicates that the output of the optical sensor 34 is greater than the output of the optical sensor 36, when the airmail mark detector 86 of the optical sensor 34 detects the airmail mark in the leading half portion of the envelope, and when the flap detector 40 detects the flap after the front and back of the envelope is reversed, the envelope is:

face-up/upside-down (3) When the output of the comparator 72 indicates that the output of the optical sensor 34 is less than the output of the optical sensor 36, when the airmail mark detector 86 of the optical sensor 34 detects the airmail mark in the leading half portion of the envelope, and when the flap detector 40 detects the flap before the front and back of the envelope is reversed, the envelope is:

facedown/rightside-up (4) When the output of the comparator 72 indicates that the output of the optical sensor 34 is less than the output of the optical sensor 36, when the airmail detector 86 of the optical sensor 34 detects the airmail mark in the trailing half portion of the envelope and when the flap detector 38 detects the flap before the front and back of the envelope is reversed, the envelope is:

facedown/upside-down

The discriminating circuit 70 controls the stampers 42 and 44 to stamp the reception mark on the backside of the envelope to which the above-described discrimination is made, and it also controls the gates 52, 54, 56, and 58 for allowing the envelopes to be collected in the respective first to fourth collecting boxes 60, 62, 64, and 66 corresponding to those gates. The envelopes which do not satisfy the respective discriminating standards are collected in the reject collecting box 68. Thereafter, the envelopes are taken out from the collector boxes while being straightened out, and are fed to a bar code printer or to a postal district number reader.

Of course as an alternate, gate 46 may be actuated to cause an envelope to pass through reversing belt 48 when neither flap detector 38 nor flap detector 40 detect a shadow, suggesting the envelope is face up.

As described above, according to this embodiment, the envelope is sorted mainly on the basis of the detection of the flap and is additionally based on the detection of the printed area and the airmail mark, rather than being based on the detection of the stamp. Therefore, mixed envelopes from a number of different contries can be exactly sorted. Automatic handling of mail from overseas and the quick delivery of the mail is realized.

This invention is not limited to the above mentioned embodiment and may be adapted to an apparatus for detecting a wrinkle on a paper sheet or a distortion on an article. For example, according to this invention, an apparatus for detecting a wrinkle in a paper sheet used to form a paper package for milk or juice. Such a paper sheet has printed on it the name of the contents and the name of the manufacture before packaging. During this printing process a wrinkle may appear on the paper sheet. If such a paper sheet is used in packaging, the contents may leak out from the wrinkle. Moreover, if the adhesion portion includes the wrinkle, the paper sheet can not be fully adhered, which also leads to the leakage of the contents. Therefore, it is desireable to detect the presence of a wrinkle on such a paper sheet.

What is claimed is:

1. An apparatus for detecting the direction of a paper sheet having a first surface with a flap and a second surface comprising:
means for transporting said paper sheet;
means for radiating a parallel light beam on one surface of said paper sheet being transported from an oblique direction with respect to the surface of the paper sheet, said parallel light beam crossing the direction of the outline of said flap;
means for receiving said light beam reflected from said one surface of said paper sheet to detect a shadow which is caused by said flap being obliquely radiated from said parallel light beam;
means for determining whether said second surface is facing said receiving means when said receiving means does not detect said shadow or said first surface is facing said receiving means when said receiving means does detect a shadow; and
means for reversing said first and second surfaces of said paper sheet when said judging means judges that said second surface is facing said receiving means, said reversing means carrying said paper sheet back to said transporting means after said reversing.

2. An apparatus according to claim 1, in which said radiating means and said receiving means are provided over a transporting passage of said transporting means.

3. An apparatus according to claim 1, in which said receiving means detects the shadow, of said flap when the level of the reflected light beam is continuously lower than a predetermined level for a given length on the paper sheet.

4. An apparatus according to claim 1, in which said transporting means transports the paper sheet lengthwise, and said radiating means comprises means for generating first and second parallel beams from the right and left sides in the carrying direction of the paper sheet, and said receiving means comprises first and second photo-detectors provided over a transporting passage of said transporting means for receiving light beams emitted from said first and second beams and reflected from the paper sheet.

5. An apparatus according to claim 4, in which said apparatus is for detecting the direction an envelope having said flap on said first surface.

6. An apparatus according to claim 5, in which said judging means determines whether or not the envelope is carried upside-down according to which one of said first and second photo-detectors detects the shadow of said flap before or after the front and back sides of said envelope are reversed.

7. An apparatus according to claim 6, which further comprises means for arranging the direction of the envelope, and means for stamping a reception mark on the back of the envelope.

8. A method for detecting the direction of a paper sheet having a first surface with flap and a second surface comprising the steps of:
   transporting said paper sheet;
   radiating a parallel light beam on one surface of said paper sheet being transported from an oblique direction with respect to the surface of said paper sheet, crossing the direction of an outline of said flap with said parallel light;
   receiving the light beam reflected from said one surface of said paper sheet to detect a shadow which is caused by said flap being obliquely radiated from said parallel light beam;
   judging whether said second surface is said one surface when said receiving means does not detect said shadow or said first surface is said one surface when said receiving means does detect a shadow; and
   reversing said first and second surfaces of said paper sheet when said judging steps judges that said second surface is facing said one surface, said reversing step also includes the step of repeating said transporting radiating and receiving steps.

* * * * *